(12) United States Patent
Mouton et al.

(10) Patent No.: US 7,447,191 B2
(45) Date of Patent: Nov. 4, 2008

(54) GHOST NETWORK BUILT USING DATA TRANSMISSION VIA PHANTOM MODE

(75) Inventors: Michel Mouton, Strasbourg (FR);
Raymond Gass, Bolsenheim (FR);
Michel Le Creff, Vigny (FR)

(73) Assignee: Alcatel, Paris (FR)

( * ) Notice: Subject to any disclaimer, the term of this patent is extended or adjusted under 35 U.S.C. 154(b) by 1005 days.

(21) Appl. No.: 10/222,808

(22) Filed: Aug. 19, 2002

(65) Prior Publication Data
US 2003/0035472 A1    Feb. 20, 2003

(30) Foreign Application Priority Data
Aug. 20, 2001    (EP) .................... 01440269
Aug. 12, 2002    (EP) .................... 02360238

(51) Int. Cl.
*H04J 3/08*     (2006.01)
*H04J 15/00*    (2006.01)
*H04L 12/66*    (2006.01)
*H04B 1/38*     (2006.01)

(52) U.S. Cl. .................... 370/352; 370/200; 370/502; 375/222

(58) Field of Classification Search ......... 370/201–286, 370/352–396, 465–493, 501–502, 401–463; 379/322–325, 399–413; 375/222–258; 709/221
See application file for complete search history.

(56) References Cited

U.S. PATENT DOCUMENTS

| | | | | |
|---|---|---|---|---|
| 4,484,306 A | * | 11/1984 | Kulczyckyj et al. ............. | 726/3 |
| 5,471,190 A | * | 11/1995 | Zimmermann ......... | 340/310.11 |
| 5,555,274 A | * | 9/1996 | Sheets ........................ | 375/257 |
| 5,742,514 A | * | 4/1998 | Bonola ....................... | 700/286 |
| 5,835,719 A | * | 11/1998 | Gibson et al. .............. | 709/221 |
| 5,901,205 A | * | 5/1999 | Smith et al. .............. | 379/93.01 |
| 6,115,468 A | * | 9/2000 | De Nicolo .................. | 379/413 |
| 6,134,241 A | * | 10/2000 | Ruprecht .................... | 370/463 |

(Continued)

FOREIGN PATENT DOCUMENTS

EP    1100226 A1    5/2001

(Continued)

OTHER PUBLICATIONS

IEEE 802.3af DTE Power via MDI Task Force Document -Paper No. XP-002204242—Jul. 2, 2002.

*Primary Examiner*—M. Phan
(74) *Attorney, Agent, or Firm*—Sughrue Mion, PLLC (57) ABSTRACT

A power supply distributor permits to broadcast data received in phantom mode at one of its port to at least few of the other ports such that the respective apparatus connected to the power supply distributor will receive them. The power supply distributor includes modems for at least few of the communications links, while the modems are connected between each other through a multiplexer. Optionally, the multiplexer is setup with a switching function. This enables advantageously to select the ports to which received data in phantom mode will be forwarded allowing to buildup a communications link between different apparatus, such link being based solely on transmission of data in phantom mode. Such links can be setup in a bi-directional modus between at least two apparatus. A ghost network is designed which is mapped on an existing network and based on transmission of data in a phantom mode.

23 Claims, 6 Drawing Sheets

U.S. PATENT DOCUMENTS

| | | | | |
|---|---|---|---|---|
| 6,147,963 | A * | 11/2000 | Walker et al. | 370/200 |
| 6,218,930 | B1 * | 4/2001 | Katzenberg et al. | 370/200 |
| 6,480,510 | B1 * | 11/2002 | Binder | 370/502 |
| 6,507,608 | B1 * | 1/2003 | Norrell | 375/219 |
| 6,643,566 | B1 * | 11/2003 | Lehr et al. | 700/286 |
| 6,804,351 | B1 * | 10/2004 | Karam | 379/413 |
| 6,954,863 | B2 * | 10/2005 | Mouton | 713/300 |
| 7,095,756 | B2 * | 8/2006 | Binder | 370/502 |
| 7,099,463 | B1 * | 8/2006 | Karam | 379/413.03 |
| 7,123,578 | B2 * | 10/2006 | Walker et al. | 370/200 |
| 7,190,716 | B2 * | 3/2007 | Norrell et al. | 375/222 |
| 7,231,535 | B2 * | 6/2007 | Le Creff et al. | 713/340 |
| 2002/0191553 | A1 * | 12/2002 | Lehr et al. | 370/318 |
| 2002/0196129 | A1 * | 12/2002 | Mouton et al. | 340/310.01 |
| 2004/0037300 | A1 * | 2/2004 | Lehr et al. | 370/401 |
| 2004/0095917 | A1 * | 5/2004 | Lehr et al. | 370/338 |
| 2004/0095933 | A1 * | 5/2004 | Lehr et al. | 370/389 |
| 2004/0174897 | A1 * | 9/2004 | Binder | 370/463 |
| 2006/0268966 | A1 * | 11/2006 | Cioffi et al. | 375/222 |

FOREIGN PATENT DOCUMENTS

| | | |
|---|---|---|
| WO | WO 0041496 | 7/2000 |

* cited by examiner

GHOST NETWORK BUILT USING DATA TRANSMISSION VIA PHANTOM MODE

TECHNICAL FIELD OF THE INVENTION

The present invention relates to a power supply distributor comprising a plurality of ports for the connection of apparatus via their respective communications link while at least few of said ports being connected at their respective medium data interface to some power supply. Furthermore, the invention relates to a method for transmitting data in phantom mode using at least a power supply distributor comprising a plurality of ports for the connection of apparatus via their respective communications link. The invention relates more generally to a network comprising a plurality of interconnected nodes and to a method to design such kind of network based on the use of phantom mode for the transmission of data on at least part of the links connecting the different nodes of said network. The invention is partly based on a priority application EP 01 440 269.7 which is hereby incorporated by reference.

BACKGROUND OF THE INVENTION

The growth of the Internet and similar local and wide area networks (LAN and metropolitan ones) based on Ethernet technology has created a potential market for telecommunications systems to be connected directly to such networks. A typical Ethernet connection to an office location with a telecommunications system is usually based on the use of half of the 8 wires of a line L separated in two unshielded twisted pair of wires giving—one pair for transmission Tx, one for reception Rx. The transmission pair is dedicated to send packets of data over the Ethernet connection; the reception pair receives packets of data over the Ethernet connection. The four other wires are usually not used for data transmission but could also be used in a similar way.

At the IEEE committee 802.3 (Ethernet) was set a project 802.3af concerning remote powering of data terminal equipment DTE connected to an Ethernet interface i.e. a DTE powered by a media dependent interface MDI. There is discussed the possibilities and feasibility to remotely power a terminal via center taps using two pairs of wires of the line L as conductors of a phantom circuit. Particularly in U.S. Pat. No. 6,115,468 is disclosed an Ethernet device power transmission system providing electrical power to telecommunications terminals such as Ethernet telephones and related equipment over a 4-wire Ethernet connection. This is achieved without the need for rewiring premises having an existing 4-wire Ethernet system. This system includes an input transformer, an output transformer and a pair of twisted pair conductors. The input transformer includes a pair of primaries for connection to a source of Ethernet data. The input transformer also includes a pair of secondaries, each having a center-tap. A first twisted pair conductor is connected across the first secondary, a second twisted pair conductor is connected across the second secondary and a DC-bias is provided between the respective center taps of the first and second secondaries. At the local end, the output transformer includes a first and second center-tapped primary and a first and second secondary for connection to the load device. The first and second primary center taps are connected to a power processor for extraction of DC power.

In EP1100226 is disclosed a more specific method of providing a remote power feed to a telecommunications terminal over an Ethernet connection. Previously sending a power supply current over that connection, at least one detection signal on at least two conductors of that connection is fed for detecting the presence of a telecommunications terminal adapted to receive a remote power feed. Applying such method shall prevent all risk to such terminal because the remote power feed current is sent only if the terminal has been identified as one which is adapted to receive a remote power feed. The intensity and duration of the detection signal are chosen so that the operation of detecting the terminal cannot cause any damage if it is not one which is adapted to receive a remote power fed.

In a further development described in U.S. Pat. No. 5,555,274, similar signals can be used to build a phantom (out of band) data link for performance monitoring information. It allows a telephone company central offices and a remote location to communicate with each other over existing telephone lines, without interfering with, or displacing any telephone communications being sent over the lines. In U.S. Pat. No. 6,147,963 is discussed the use of such phantom data link for transmitting and receiving dc balanced data strobe signals. This enables to distribute power via the phantom circuit as well as data under the control of a continuously variable clock. In such a way, it is possible to synchronize all the terminals connected to such phantom data link.

In WO 00/41496 is described the application of remote powering on a local area network. Such network includes a hub, a plurality of nodes, communications cabling connecting the plurality of nodes to the hub for proving data communications, and a power supply distributor operative to provide at least some operating power to at least some of the plurality of nodes via the communication cabling. The hub has a data communication concentrator which is connected to each node through a combiner of the power supply, by the communication cabling. The data communication concentrator is provided for transmitting data to each node through the cabling, while the combiner supplies power to each node through the cabling. That powering managed by the combiner is controlled via some electrical gates activated by a controller. The latter receives control input from a sensor which may be implemented in a number of possible ways. One is such that it may sense a control signal transmitted in phantom mode via the communications cabling from the power management.

SUMMARY OF THE INVENTION

It is an object of the present invention to enable to broadcast some information to an apparatus connected to a local area network without interfering with existing transmission of data and not implying a new specific rewiring. It is further an object of the present invention to design a new network based on the existing one without implying a new rewiring.

According to a first aspect of this invention, this object is attained by a power supply distributor comprising a plurality of ports for the connection of apparatuses via their respective communications link while at least few of said ports being connected at their respective medium data interface to some power supply. Said power supply distributor comprises modems connected to at least a few of said medium data interfaces to process data transmitted in phantom mode via a respective communications link, said modems being connected between each other through a multiplexer.

Furthermore, its object is attained by a method for transmitting data in phantom mode using at least a power supply distributor, in accordance with the first aspect of this invention. The method is based on the following steps: receiving data in phantom mode at a port from an apparatus via its communication link; processing said data by the modem connected to the medium data interface of that port; forwarding said data to said multiplexer to be broadcast to other connected modems; forwarding said broadcast data by the modems to the medium data interface of the corresponding ports to be further transmittable in phantom mode via communication links to apparatus connected to that ports.

According to a second aspect of the invention, its object is achieved by a network comprising a plurality of interconnected nodes with at least at one of these nodes, a power supply distributor, in accordance with the first aspect of this invention.

Furthermore, its object is also achieved by a method to design a network based on the use of phantom mode for the transmission of data on at least part of the links connecting the different nodes of said network while said data in phantom mode will be switched at specific links using a power display distributor, in accordance with the first aspect of this invention.

It is advantageously taken profit of the connection of apparatus like IP telecommunications terminals to a network via a 4-wire Ethernet-like connection. Those wiring combined together with center taps enable to feed and collect a signal made of a frequency modulation using the conductors of the wiring as the one of a phantom circuit. The use of a power supply distributor according to the present invention, at a node of such network allows not only to control the remote powering of a lot of different apparatuses but on top of that permits the transmission of data in a phantom mode.

According to an embodiment of the invention, data received in phantom mode at a port of said power supply distributor will be broadcast by a multiplexer to at least few of the other ports such that the respective apparatus connected to said power supply distributor and able to extract data in phantom mode will receive them. This gives a possibility to transmit data to the different apparatus connected to that network using phantom mode. It is not necessarily restricted to apparatus supplied with remote powering. It can be used for backup application or localization of an apparatus in emergency call.

In another embodiment of the invention, said multiplexer is setup with a switching function. This enables advantageously to select the ports to which received data in phantom mode will be forwarded. In such a way, it is possible to buildup a telecommunications between different apparatus connected to the network where such power supply distributor is connected, such telecommunications being based solely on data in phantom mode. It is also conceivable that such telecommunications is buildup in a bi-directional modus between at least two apparatus.

According to a further embodiment of the invention, it is possible to design a new network—ghost network—mapped on an existing network but not necessarily with all same link by using a power supply distributor and with transmission of data in phantom mode. These data transmitted through such new network are independent of the transmission of data in Ethernet kind of mode. But gateways might be included to permit an inter-working between the Ethernet network and the ghost network.

Using such a ghost network gives further the possibility to optimize the remote powering of different class of apparatus as well as its updating when an apparatus was added or changed on that network. Therefore, it can even be used as a backup channel for the different apparatus without needing to surcharge the Ethernet-kind of network. It is also possible to use that ghost network for the transmission of localization information in case of an emergency call (911-service in the US, 112-service in Europe).

Further advantageous features of the invention are defined in the dependent claims and will become apparent from the following description and the drawings.

BRIEF DESCRIPTION OF THE DRAWINGS

An embodiment of the invention will now be explained in more details with reference to the accompanying drawings, in which.

DETAILED DESCRIPTION OF PREFERRED EMBODIMENTS

Figure 1:
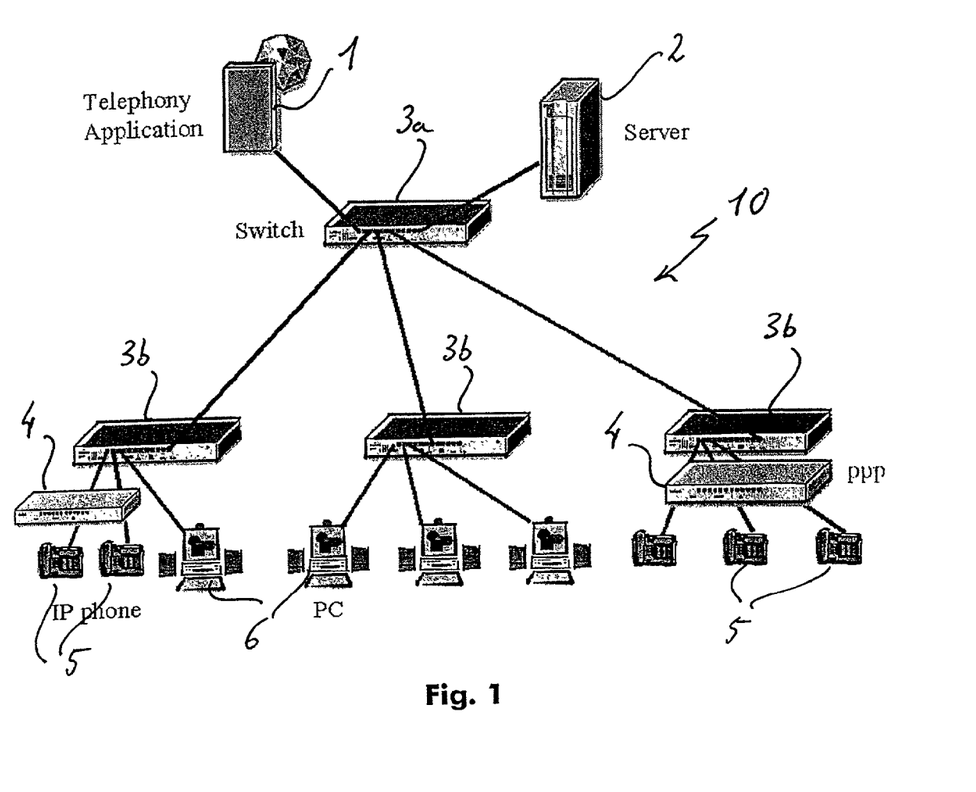
FIG. 1 is a schematic view of a network according to the state of the art.

On FIG. 1 is shown a schematic view of a network 10 according to the state of the art. There is a private branch exchange PBX 1 for telephony application. Latter can also be incorporated in a server where most of the PBX typical kind of services are integrated. The PBX 1 as well as a further server 2 are connected to a first switch 3a to which are connected several second switches 3b. To these different second switches 3b are connected a plurality of apparatus like Internet Protocol IP based terminals 5, personal computers PC 6. The IP-terminals 5 may be remotely powered by a power patch panel 4 to which the communication links coming from the switch 3b will be connected before respectively connecting these different apparatus 5.

The communication links between the switches and the different apparatus 5, 6 on FIG. 1 are e.g. point-to-point ethernet links (10BaseT, 100BaseT, 1000BaseT). The switches 3a, 3b could be also a bridge, a hub, a router or more generally a network element, the differences being mostly on the used protocol i.e. working level (Layers 1, 2 or even 3 of the OSI Reference Model) for the transmission of data. It could even be possible to consider to build a similar network based on a Token Ring of FDDI princip.

On a network as shown in FIG. 1, the remote powering is performed by the power patch panel PPP 4 which supply powering to the different IP-terminals 5 using a respective phantom circuit of the telecommunications links of the apparatus. Data sent by any of the network elements 2, 3a, 3b or even the PBX 1 will not be affected by the PPP 4. This is the case even for data sent in phantom mode since it is made out of dc modulation which can be easily added to the powering. In fact, the PPP 4 will be "transparent" for the data on the links of the network 10.

Using the phantom mode for transmission of data together with a kind of PPP 4 as known in the state of the art allows only to forward data in such mode link by link to the apparatus without any possibility to broadcast to several apparatus or to differentiate between the different apparatus connected to that PPP 4.

Figure 2:
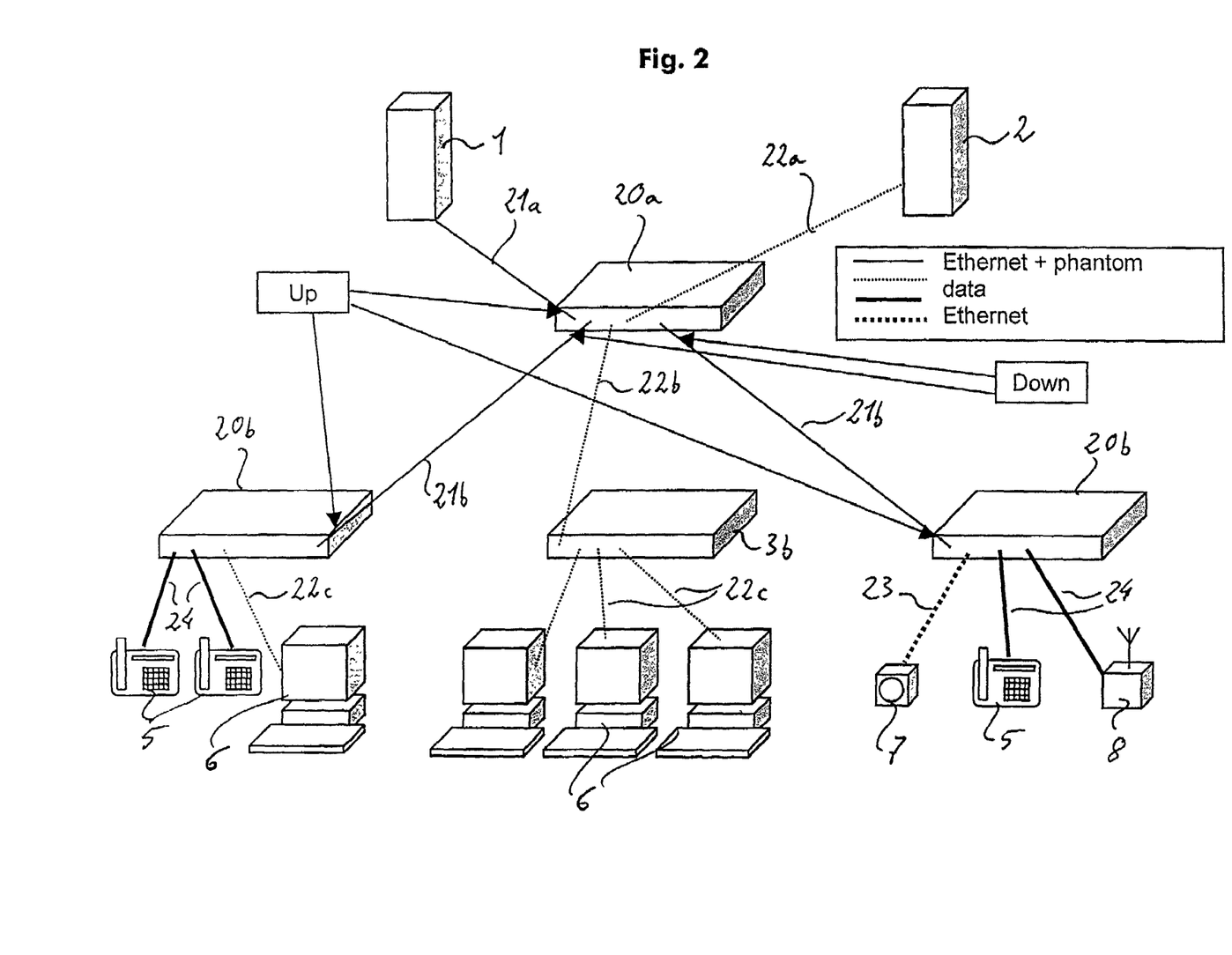
FIG. 2 is a schematic view of a network according to an embodiment of the invention.

In contrary, the use of a power supply distributor according to the invention allows to define a new transmission scheme between different apparatus connected at a network. On FIG.

2 is described a network with a PBX 1 and a server 2 connected respectively via the communication link 21*a* and 22*a* to a network element 20*a*. Latter 20*a* is a combination of a switch and a power supply distributor comprising a PPP. To this network element are connected other network elements in a tree organization. Two 20*b* of these network elements comprise further power supply distributor combined with a switch. They are linked to the first network element 20*a* via the path 21*b*. One 3*b* of these network elements is a single switch linked via the path 22*b*. To this switch 3*b* are connected typical terminals which cannot be or shall not be remotely powered like PC 6. To the network elements 20*b* comprising a power supply distributor are connected apparatus which can be remotely powered like an IP-phone 5, a web cam 7 or a DECT base station 8.

The powering function may be included in new generation of Ethernet switch, but legacy equipment can be considered: in that particular case, the powering is implemented in a specific box, usually called a Power Patch Panel (PPP) that performs mid-span insertion (at center tap). A Power Patch Panel comprises:

Local power (with possible backup) for it's own operation, and for the powering of the attached devices behind the Ethernet links;

Circuitry for remote power injection over the phantom pair;

Logic for the correct identification of the connected devices;

A control unit for local management of the building blocs and for configuration dialog with a least one specific server in the customer premises.

The network as shown on FIG. 2 which could be a typical LAN contains four different kind of communications links all based physically on same kind of line i.e. 8 wires with usually only half of them used for data transmission in separated two unshielded twisted pair of wires. The more classical links of such network are the links 22*a*-22*c* which carry only Ethernet kind of data. Those links are used for the connection between different network elements like servers 2 and switches 3*b*. The same kind of link are used for the terminals which never will be remotely powered.

Another kind of communications link 21*a*, 21*b* is the one connecting the PBX 1 to network elements 20*a*, 20*b* which contains a power supply distributor according to the invention. On such a link 21*a*, 21*b* will be transmitted the usual Ethernet kind of data and on top of that data in a phantom mode. The use of a power supply distributor according to the invention at e.g. the network element 20*a* allows the selection of the down links to which data in phantom mode will be forwarded. At the last level of the tree of that network are two more links 23, 24. One of them connects an apparatus like a web cam 7 which will be used for remotely powering it without transmission of data in phantom mode. Such apparatus may not have the necessary setup for extracting data in phantom mode out of a communications link i.e. mostly a modem connected at center taps. The last kind of the four links connects apparatuses which have to be connected to the network, and to be remotely powered and are able to extract data in phantom mode. These are typically IP-phones 5 or a DECT base station 8.

Figure 3:
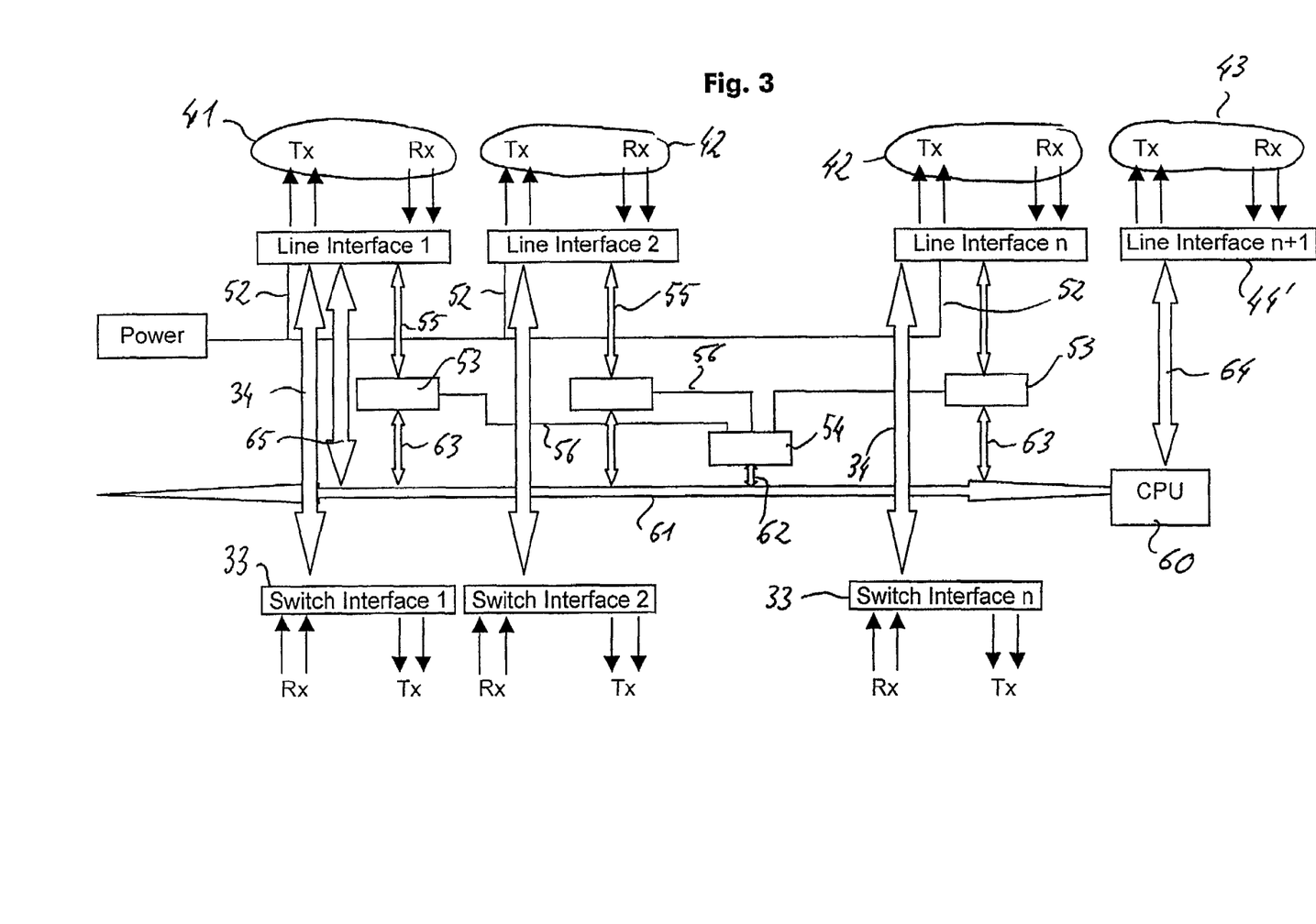
FIG. 3 is a bloc diagram of a power supply distributor according to the invention.

On FIG. 3 is shown a block diagram of a power supply distributor according to the invention. Each different communications line is connected at the patch panel of the power supply distributor to different ports 41, 42, 43. In the shown case, the power supply distributor comprises n+1 ports for all the line interfaces or medium data interface MDI 44, 44'. At least a few of these ports are connected at the MDI 44 with a power supply 51 via an electrical link 52. Usually, the electrical link 52 will be performed with the two pairs of conductors Tx, Rx using center taps of a phantom circuit. In such a way, a remote powering of the apparatus connected to these ports 41, 42 will be possible.

A main new characteristic of the power supply distributor is that few of its ports 41, 42 are connected 55 at their respective MDI 44 to a modem 53 while said modems are connected 56 between each other through a multiplexer 54. On FIG. 3 is further shown that said power supply distributor comprises a Central Processing Unit CPU 60 to which is connected a bus 61. The multiplexer 54 as well as the modems 53 are connected via a link respectively 62, 63 to this bus 61. This allows the option of a control from the CPU 60 of the modems 53 and/or the multiplexer 54. The CPU may be managed locally via an apparatus connected to the power supply distributor at a specific port 43 with its line interface n+1 directly in connection 64 with the CPU. This offers a possibility to act locally on the multiplexer 54 and the different modems 53. A further link 65 may connect the different MDI 44 with this bus 61. This link may be used to control the MDI 44 and therefore the remote powering. The protocol used there may be based on Simple Network Management Protocol SNMP, the basis for usual network management software.

At least few of the ports 41, 42 (line interface 1 till n) of the power supply distributor are connectable to the ports 33 of a network element here a switch (switch interface 1 till n) via a link 34 directly connected at the respective MDI 44. This link 34 is dedicated for data in Ethernet mode only.

Figure 4:
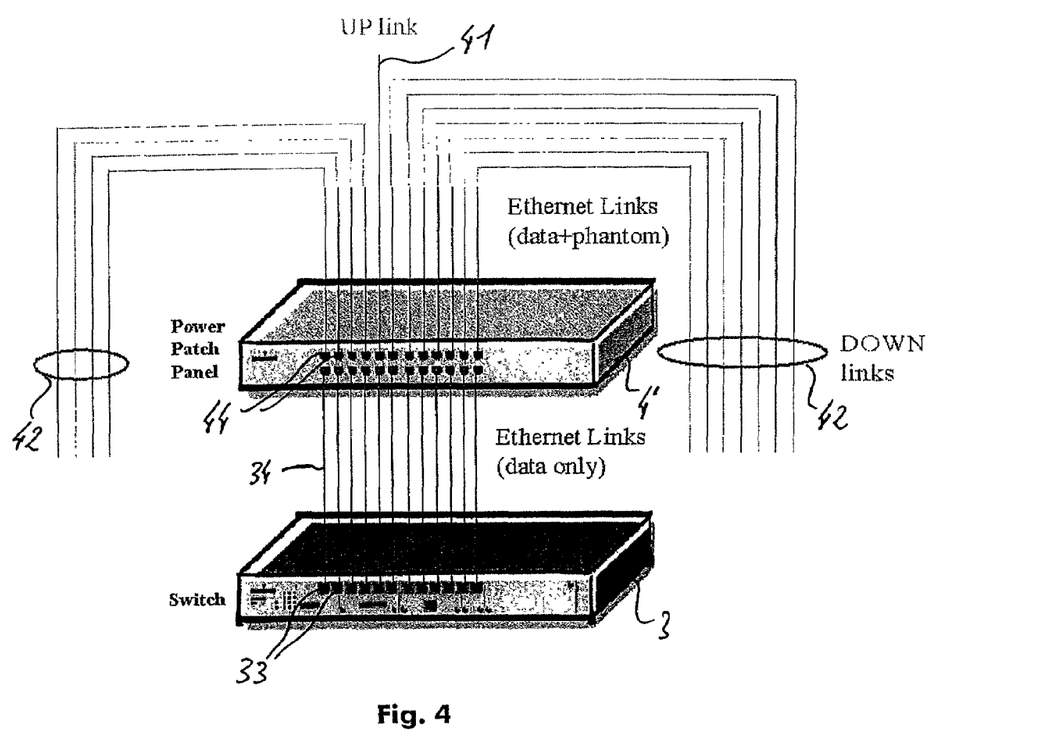
FIG. 4 is a schematic view of a power supply distributor according to an embodiment of the invention.

On FIG. 4 is shown schematically the panel of a power supply distributor 4' according to the invention together with the panel of a switch 3. All the communications lines 41, 42 connecting apparatus or nodes of the networks end on a separate port 44 of the power supply distributor. One communications line 41 is defined as an up link while the others being a down link 42. The difference between up 41 and down link is best described by referring on the tree structure of the network of FIG. 2. An up link of a network element 20*a*, 20*b*, being a power supply distributor according to the invention comprising a switch is a link coming from the PBX or server with telephony application 1 or another similar network element 20*a* being in a higher level of the tree. This link provides in phantom mode at least synchronization patterns and broadcast information which shall be relayed by the power supply distributor to the down links. The down links are the one building the arborescence of the tree like network, therefore connecting another network element 20*b* or ending at the different terminals attached to that network.

Not shown on FIG. 3 is the communication line 43 for a local control of main of the characteristics of such power supply distributor 4'. Indeed, it is also possible to control a power supply distributor i.e. its multiplexer (54 on FIG. 3) via its CPU (60 on FIG. 3) not locally as discussed before but remotely. The commands are defined using a protocol usually based on SNMP and embedded in Ethernet data to be transmitted via the up link 41 or a down link 42 to the power supply distributor. This is possible if the CPU (60 on FIG. 3) is directly in connection with the MDI 44 of the corresponding link 41 or 42 on which is received the data as it is the case on FIG. 3 with the bus 61 and 65.

The well known features of a power supply distributor are: verification that the connected apparatus needs really remote power or not by checking its specific signature before starting to remotely powering it; check plug and unplug operation performed on the links connected to its different ports; feeding the apparatus phantom mode; communication with a management server via an Ethernet link.

According to the invention power signals over the phantom pair between the power supply distributor PPP and the terminals connected to that network or between different PPP is modulated/demodulated to provide a bi-directional out-of-band channel. This together with the multiplexer function makes it possible to build a second, "overlay" network—ghost network—, where topology (tree configuration) might be different from the underlying Ethernet network.

The ghost network according to the invention is based on: i) transmission of data in phantom mode, point-to-point between adjacent apparatus of the network (e.g. switches or edge devices like terminals); ii) relay of relevant information by the power supply distributor according to the invention to provide a link between non-adjacent apparatus of this network. The processing of such additional information may use SNMP protocol if selected to some administration task. The ghost network is plesiochronous i.e. it involves multiple digital synchronous circuits running at different clock rates. The synchronization is preferably provided by a network element defined as being a central point connected to the LAN. Several of such kind of central points may be defined for backup purposes.

Figure 5:
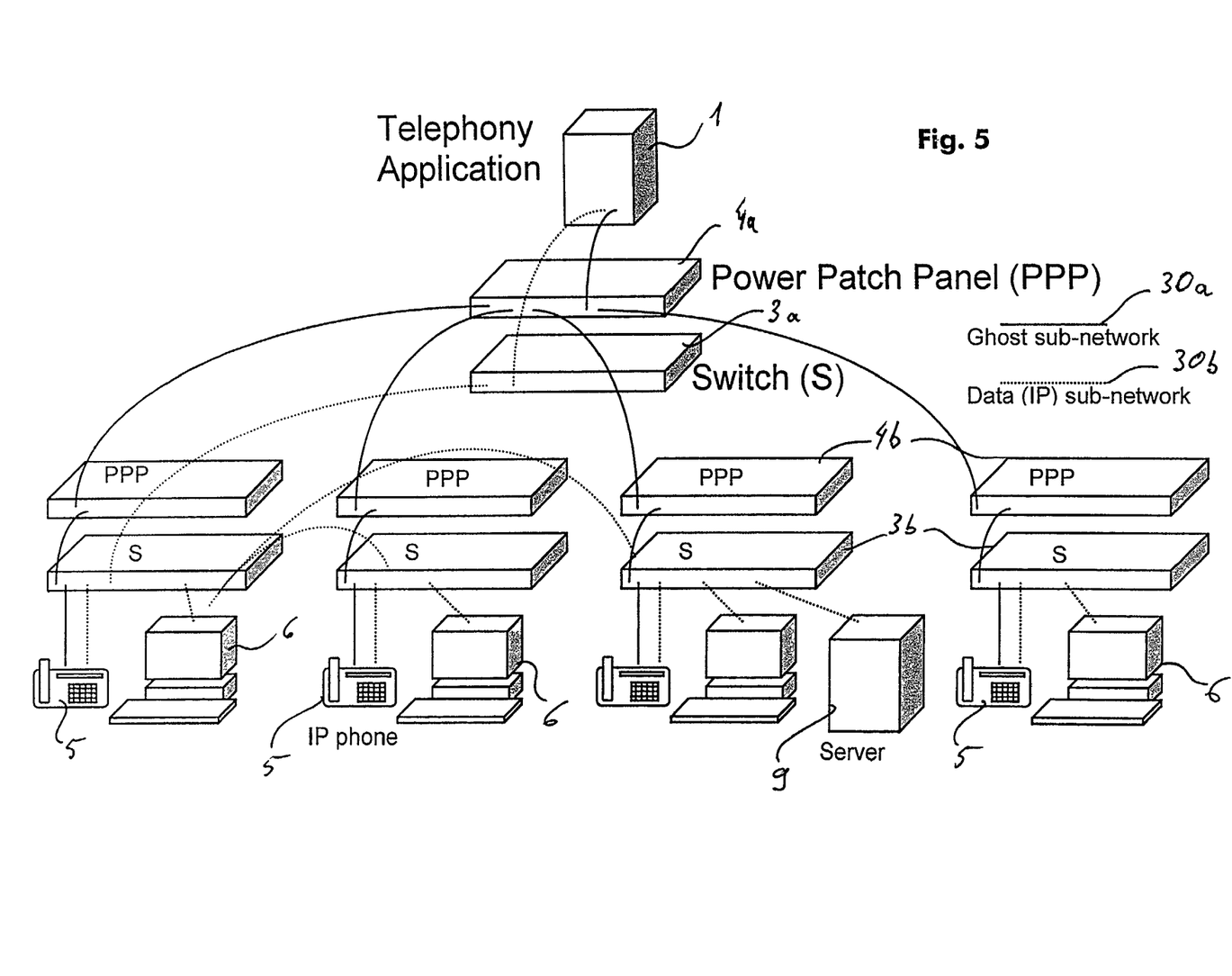
FIG. 5 is a schematic view of a network with the different paths for the transmission of data in phantom mode according to the invention.

On FIG. 5 is shown an example of the coexistence of a data and a ghost network. As in the previous example of FIG. 2, a PBX or server 1 comprising the telephony application is connected to a power supply distributor 4a according to the invention combined with a switch 3a. In a tree-kind of architecture, different network elements—here, all being a combination of a power supply distributor 4b with a switch 3b—are further connected to the first power supply distributor 4a. Different terminals like IP-phones 5 or PCs 6 or server 9 are further connected to these power supply distributors 4b. The data (IP) sub-network is defined by links shown in dotted lines 30b. The ghost sub-network is defined by links shown in full lines. It is clear that two different networks can be designed using the same cabling.

Two different transmission schemes can be offered, depending on the services to be implemented:
  unidirectional transmission, where information is broadcast from one central point to every leaf of the tree. This is the case for synchronization and audio broadcast;
  bidirectional ping pong transmission (see FIG. 6): data is transmitted alternatively in the UP and DOWN directions, with idle period in time scale in between. In addition to the services described in the unidirectional transmission, this mode of operation offers supplementary services, such as overlay circuit switch network, localization information in case of an emergency call (911-service in the US, 112-service in Europe), maintenance, etc.

Figure 6:
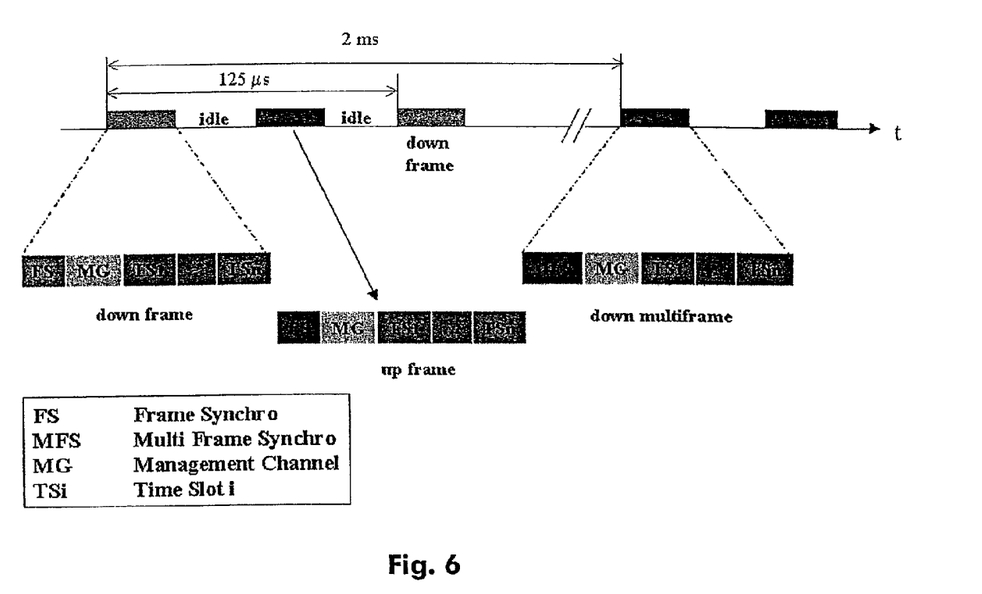
FIG. 6 is a diagram of data transmission in a bi-directional link according to the invention.

An example of ping pong transmission for plesiochronous signals is given on FIG. 6.

Such ghost network used in bidirectional transmission scheme allows for example to transmit typical delay measurement occurring on the transmission of data in Ethernet mode on specific links. The great advantage of using a ghost network according to the invention in this case is that it is not performed to the detriment of the transmission of data in Ethernet mode. The transmission of data in phantom mode occurs completely in an independent way to the transmission of data in Ethernet mode. And no interference may occur even if the rate for the transmission of data in phantom mode may be in the range of several MB per second.

The use of the architecture described above (FIG. 2 or 5) and a classical frame/multi-frame organization enables to build the ghost network in providing:
  a physical medium;
  a synchronization system;
  a communication protocol.

The physical medium uses the existing Ethernet pairs on which the feeding phantom current is modulated. The synchronization system is realized by a central equipment that settles the transmission of frame and multi-frame words.

Many kind of apparatus or equipment can be connected to the end of the links: Ethernet telephones i.e. IP-phone, Radio base stations (DECT for example), Small PBX, etc. All these equipment may comprise the necessary means to modulate, demodulate, interpret and process the signals transmitted over the ghost network. These means enable to use two different kind of links (Ethernet and phantom) and consequently to give access to two different networks.

As an example, one function of the ghost network enables to broadcast background music. Another one function enables to connect a traditional PABX (circuit mode). In such a case, the trunk line (T0 or T2) is modified to be connected to the ghost network for communication transmission in circuit mode to public network without obstruct the LAN and without using costly equipment for protocol changes.

It is possible to connect several PBX on the ghost network; in this case it is necessary to reserve channels for each PBX. The call server sets up permanent or temporary links in allocating:
  for each PBX via TCP-IP channel, the used channel numbers;
  for each PPP via SNMP channel, the necessary information for framing/un-framing time slots after concentration for forwarding to destination.

The call server also indicates to every power supply distributor PPP, via SNMP channel, the concerned port numbers to set up the links and connections to be done. These characteristics enable to offer in each power supply distributor with its multiplexer a mux and/or demux functions. An important feature of telephone systems is autonomy vis à vis power failure. At present this feature is not available in data networks. Some new architectures using data network to offer voice over IP do not provide autonomy in case of power failure. The proposed ghost network enables to recover a certain autonomy level in using IP phones remotely powered and in organizing the network in an appropriate way:
  PPPs have their own batteries for themselves and the telephones;
  the servers and IP or ISDN external network interfaces have their own backup power supply;
  in addition with existing means on the Ethernet link, the telephone terminals comprise also means to receive and transmit communications via phantom links.

The autonomy given by the ghost network enables to provide a minimum service in case of dysfunction of the data network to set up internal and or external calls.

The invention claimed is:

1. A power supply distributor comprising:
  a plurality of ports for the connection of apparatuses via the respective communications link of the apparatuses while at least a few of said ports are connected at their respective medium data interface to a power supply,
  wherein said power supply distributor comprises modems connected to at least a few of said medium data interfaces to process data transmitted in a phantom mode via the respective communications link of the apparatuses,
  wherein said modems are connected between each other through a multiplexer;
  wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

2. Power supply distributor according to claim 1, wherein at least a few of said ports are connectable to a network element.

3. Power supply distributor according to claim 2, comprising said network element.

4. Power supply distributor according to claim 1, comprising a bus connected to a CPU and to said multiplexer.

5. Power supply distributor according to claim 4, wherein said modems are also connected to said bus allowing to be controlled as said multiplexer by said CPU.

6. Power supply distributor according to claim 4, wherein said ports are connected at their respective medium data interface to said bus.

7. Power supply distributor according to claim 6, wherein a port is dedicated for an apparatus to control said CPU.

8. Power supply distributor according to claim 1, wherein said multiplexer is setup to broadcast data received from a modem to other modems.

9. Power supply distributor according to claim 1, wherein said multiplexer is setup with a switching function allowing to select the modems for the broadcast of the received data.

10. Power supply distributor according to claim 9, wherein said multiplexer is setup to permit a bi-directional transmission of data in phantom mode via at least a communication link using the modem connected to its corresponding medium data interface.

11. Method for transmitting data in a phantom mode using at least a power supply distributor comprising a plurality of ports for the connection of apparatuses via the respective communications links of the apparatuses, modems connected to at least few of the respective medium data interface of said ports and a multiplexer connecting said modems between each other, the method comprising the following steps:

receiving data in phantom mode at a port from an apparatus via the communication link of the apparatus;

processing said data by the modem connected to the medium data interface of said port receiving data in phantom mode;

forwarding said data to said multiplexer to be broadcast to other connected modems; and forwarding said broadcast data by the modems to the medium data interface of the corresponding ports to be further transmittable in the phantom mode via communication links to apparatuses connected to the corresponding ports;

wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

12. Method for transmitting data in a phantom mode using at least a power supply distributor comprising a plurality of ports for the connection of apparatuses via the respective communications links of the apparatuses, modems connected to at least few of a respective medium data interface of said ports and a multiplexer connecting said modems between each other while said multiplexer comprises switching functions, the method comprising the following steps:

receiving data in the phantom mode at a port from an apparatus via its communication link;

processing said data by the modem connected to the medium data interface of the port receiving the data in the phantom mode;

forwarding said data to said multiplexer;

selecting by said multiplexer using said switching function at least a modem to further transmit said data; and forwarding said data by the selected modem to the medium data interface of the corresponding port to be further transmittable in phantom mode via a communication link to the apparatus connected to the corresponding port;

wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

13. Method according to claim 11, wherein at least a few of the ports are connected at their respective medium data interface to a power supply allowing a remote powering via a communication link of the apparatus to be connected to the ports.

14. Method according to claim 13, wherein said multiplexer will be controlled from a local management to be connected at a specific port of said power supply distributor, said port being directly in connection with said multiplexer.

15. Method according to claim 13, wherein the multiplexer will be remotely controlled by an apparatus via a communication link to be connected to a port of said power supply distributor.

16. Method according to claim 14, wherein said multiplexer will be controlled via a CPU connected to the multiplexer and to said port.

17. A network comprising:

a plurality of interconnected nodes with at least a power supply distributor at one of the plurality of interconnected nodes, wherein said power supply distributor comprises a plurality of ports for the connection of apparatuses via their respective communications link and at least a few of said ports being connected at their respective medium data interface to a power supply, wherein said power supply distributor comprises modems connected to at least a few of said medium data interfaces to process data transmitted in a phantom mode via a respective communications link, while said modems being connected between each other through a multiplexer allowing broadcasting data in the phantom mode to at least two different communications links;

wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

18. A network comprising:

a plurality of interconnected nodes with at least a power supply distributor at one of the plurality of interconnected nodes, wherein said power supply distributor comprises a plurality of ports for the connection of apparatuses via their respective communications link and at least few of said ports being connected at the respective medium data interface of the ports to a power supply, wherein said power supply distributor comprises modems connected to at least a few of said medium data interfaces to process data transmitted in a phantom mode via a respective communications link, while said modems are connected between each other through a multiplexer setup with a switching function allowing to select at least a communications link to which the data will be forwarded;

wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

19. A method to design a network based on the use of a phantom mode for transmission of data on at least a part of links connecting a plurality of different nodes of said network while said data in the phantom mode will be switched at specific links using a power supply distributor comprising a plurality of ports for the connection of apparatuses via the respective communications link of the apparatuses, modems connected to at least a few of the respective medium data interface of said ports and a multiplexer connecting said modems between each other while said multiplexer comprising switching functions, the method comprising the following steps:

receiving the data in the phantom mode at a port from an apparatus via the communication link of the apparatus;

processing said data by the modem connected to the medium data interface of the port receiving signals in the phantom mode;

transmitting said data to said multiplexer;

selecting by said multiplexer using said switching function at least a modem to further transmit said data;

transmitting said data by the selected modem to the medium data interface of the corresponding port to be further transmittable in the phantom mode via a communications link to the apparatus connected to the corresponding port;

wherein the transmitting data in the phantom mode comprises modulating a power signal to provide a bi-directional out-of-band channel;

wherein the transmitting of data in the phantom mode generates a plesiochronous ghost network; and wherein the data transmitted in phantom mode overlays Ethernet data.

20. The power supply distributor according to claim 1, wherein the phantom mode permits a transmission of a phantom mode data and an Ethernet data.

21. The power supply distributor according to claim 1, wherein a power supply comprises a power patch panel (PPP) comprising a local power and a circuitry for remote power injection over the phantom mode.

22. The power supply distributor according to claim 1, wherein the few of said ports are connected at their respective medium data interface to the power supply via a first electrical link.

23. The power supply distributor according to claim 22, wherein the modems are connected to the at least few of said medium data interfaces via at least one second electrical link.

* * * * *